United States Patent [19]

Marzocchi

[11] 3,772,130
[45] Nov. 13, 1973

[54] TIRE CONSTRUCTION AND ASSEMBLY TECHNIQUE

[75] Inventor: Alfred Marzocchi, Cumberland, R.I.

[73] Assignee: Owens-Corning Fiberglas Corporation, Toledo, Ohio

[22] Filed: Nov. 15, 1971

[21] Appl. No.: 198,663

Related U.S. Application Data

[60] Continuation-in-part of Ser. No. 849,766, Aug. 13, 1969, abandoned, Division of Ser. No. 199,019, Nov. 15, 1971.

[52] U.S. Cl............... 161/55, 74/231, 152/355, 152/359, 161/144, 161/202
[51] Int. Cl..... B32b 5/12, B29h 17/28, B60c 11/00
[58] Field of Search ............... 161/55, 57, 58, 202, 161/144; 152/355–356, 359, 330, 354, 357; 198/193; 74/231 P, 231 R

[56] References Cited

UNITED STATES PATENTS

| | | | |
|---|---|---|---|
| 3,115,179 | 12/1963 | Shepherd | 152/354 |
| 3,311,152 | 3/1967 | Marzocchi et al. | 152/359 |
| 3,315,722 | 4/1967 | Marzocchi et al. | 152/359 |
| 3,212,627 | 10/1965 | Beebee | 161/55 X |
| 3,546,057 | 12/1970 | Jenkins | 161/58 |
| 3,077,915 | 2/1963 | Weber | 152/355 |

Primary Examiner—Philip Dier
Attorney—Carl G. Staelin et al.

[57] ABSTRACT

Radial tire constructions are disclosed featuring glass cord belt reinforcement of particular angular disposition as permits manufacture of the tire by conventional "flat band" techniques as opposed to the usual techniques employed in the manufacture of conventional radial ply tires.

4 Claims, 14 Drawing Figures

TIRE CONSTRUCTION AND ASSEMBLY TECHNIQUE

This is a division of U.S. Pat. application Ser. No. 849,766, filed Aug. 13, 1969 and now abandoned in favor of the instant application and co-divisional U.S. application Ser. No. 199,019, filed Nov. 15, 1971.

The present invention relates to tire constructions and particularly tire constructions featuring radially disposed cords formed of substantially inextensible elements such as formed of a multiplicity of glass filaments or the like.

Radial tires have been manufactured and used extensively in Europe for some number of years. By the term "radial," of course, is meant those in which the carcass ply, which is the main body ply, is formed of cords, usually metal or rayon, which are arranged in side-by-side disposition and extend from bead to bead by the shortest possible route; that is, directly from one bead upwardly over the crown and down to the opposite bead. These cords have an approximate angular relationship of 90° with the peripheral or circumferential centerline of the tire. The radial tires additionally feature belt plies disposed outwardly from the carcass in contiguous relationship and extending laterally from approximately one shoulder region of the tire to the other. The shoulder region is that region where the tread and the side wall meet. The belt plies feature cords which are inclined at an angle with the peripheral centerline of about 14° – 20° and frequently less. The belt plies serve to stabilize the tread and, in combination with the radial disposition of the carcass cords, lend a unique overall stability to the tire characterized by the fact that the rectangular footprint of the tread remains substantially constant under even the most severe conditions encountered due to the stress imparted by the driver's operation of the vehicle upon which the tire is mounted. Thus, the tire footprint remains fairly constant at the range of speeds of which the vehicle is capable and the range of cornering maneuvers which the vehicle is exposed to. For this reason, as is well known, the radial tire has found wide acceptance in competition racing of various kinds and, as well, by owners of rather high performance sports cars who find the improved tread wear desirable.

Rayon cords, of course, are also used to a considerable extent in radial tires.

Another desirable attribute of radial ply tires resides in their generally low rolling radius which is generally the distance from the axis of rotation of the tire, e.g., the hub, to the ground. The low rolling radius of radial tires contributes to the stability and cornering abilities of the vehicle equipped therewith.

As indicated, while the radial tire has achieved some measure of acceptance in the United States and is even at the present time being manufactured to some degree by certain domestic manufacturers, it has one very serious drawback from the manufacturing point of view. Thus, the radial tire requires considerably different manufacturing technique than that employed by most domestic tire manufacturers who have been manufacturing and still manufacture the bias type tire by the well-known "flat band" process. In the bias tire, the carcass cords are bias or angularly inclined in proceeding from bead to bead. In the "flat band" process, the various components, including linear stock, carcass or body plies, usually from two or more, cushion plies, bead rings, tread stock, chafer strips, etc., are assembled onto a drum which is rotated as the various components are wound thereabout and knitted together by the operator or tire builder. After the components are assembled, the drum is collapsed and the "green" or unvulcanized assembly is taken off. The tire at this stage has somewhat the appearance of a beer barrel. The unvulcanized, beer barrel shaped item is then vulcanized in a mold of the ultimate tire configuration while at the same time an inner tube shaped bag is located inside of the drum and simultaneously expanded to move the beer barrel shaped preform into final tire configuration. The crown region of the tire during this step expands from a dimension approximating that of the bead diameter outwardly to the ultimate diameter in the tread region of the vulcanized tire. In the course of this expansion, the bias inclination of the cords changes as accommodated by the flow of the rubber before and during the curing step which usually involves temperatures of 270° – 350° F. and a cycle of usually 8 to 25 minutes.

Now the radial tire is conventionally not produced in the same manner as the bias tire. In the manufacture of radial tires, the tire preform, after the assembly of the carcass ply, beads, etc., and prior to the assembly of the belts thereon, is expanded on the tire building equipment to a size and configuration approximating 90 percent of that of the final tire. At this point, the belt plies are wrapped circumferentially about the crown, followed by the tread, etc., whereupon the tire can be then vulcanized but during whch vulcanization the tire does not change contour or configuration appreciatively as compared to that occurring during vulcanization of the bias type tire.

The belt plies as wrapped about the crown include cords disposed at the desired approximately 14° to 20° angle which remains essentially unchanged during vulcanization since the tire is not expanded as in the case of the bias tire technique featuring bag expansion as described earlier herein.

Of course, a great variety of materials have been employed as reinforcement cords for tires of the bias and the radial type. As indicated, metal has been employed in radial tires while the more conventional or domestic bias type tire has employed a number of cord materials, commencing historically with cotton and proceeding to rayon, the polyamides such as nylon, the polyesters, the polypropylenes, etc.

More recently, glass has been suggested and, in fact, employed in the manufacture of certain tires. The use of glass is, of course, prompted by several very desirable properties of a single glass filament. These include essentially 100 percent elasticity, essentially no yield under stress, excellent dimensional stability and virtual immunity to change in properties by reason of differing environmental conditions encountered.

Unfortunately, the early efforts at attempting to employ glass as reinforcement met with essentially complete failure. It is believed that this was due in part to a failure to recognize that glass, while possessing the very desirable properties above enumerated, also possesses properties which are considerably different from those of the organic textiles conventionally employed as tire reinforcements. Also, the difference in certain of these properties represents almost an entirely different order of magnitude. As the actual numerical values are obtainable from any standard reference work, they need not be recited. The properties in which there are differences include stiffness, specific gravity, toughness and breaking elongation.

In view of the above, it is believed that the employment of glass strand, yarn and cord entities as a tire reinforcement should and must proceed on the assumption that one cannot simply substitute glass for the particular organic of the past. Rather, the properties of the glass must be carefully considered in the design of the tire and, in particular, the geometrics of placement of the glass in the tire. Thus, the proper spatial location of the various plies and the make-up of the plies in terms of amount of glass, form of glass (cord, strand, yarn, filament or combination), the particular angles of disposition, etc., must be carefully evaluated in order that one may arrive at a time capable of performance and, at the same time, compatible from an economic point of view with existing manufacturing techniques. Additionally, of course, it is important that all of the foregoing be carefully balanced and designed in order that the ultimate tire can reflect in performance the very desirable properties which glass possesses.

With the foregoing introduction, it may be stated that it is an object of the present invention to provide a pneumatic tire which includes novel and improved reinforcement systems which provide features of advantage in manufacturing processes as well as possessing service capabilities which are improved as compared to tires known heretofore.

It is another object of the present invention to provide a radial type tire featuring glass reinforcement so disposed as to permit manufacture according to conventional "flat band" techniques.

It is a particular object of the present invention to provide a tire which features a unique arrangement of carcass and belt plies as lends the capabilities referred to.

It is a significant object of the present invention to provide a radial tire construction which is capable of production at lower per unit costs than conventional radial tires, albeit possessed of comparable or improved properties and performance.

The foregoing, as well as other objects of the present invention, will become apparent to those skilled in the art from the following detailed description taken in conjunction with the annexed sheets of drawings on which there are presented, for purposes of illustration only, a number of variant embodiments of the present invention.

The present invention, viewed most basically, envisions a tire having several novel features; one of which resides in the employment of glass in the form of an assembled plurality of continuous filaments of glass as a principal reinforcement and, additionally, an appropriate disposition of the glass cords as permits the manufacture of the radial type tire in conventional "flat band" equipment. The present invention additionally envisions the employment of particular auxiliary reinforcement to augment the glass cord reinforcement in a manner as unifies the tire structure in the crown and tread region.

Figure 1:
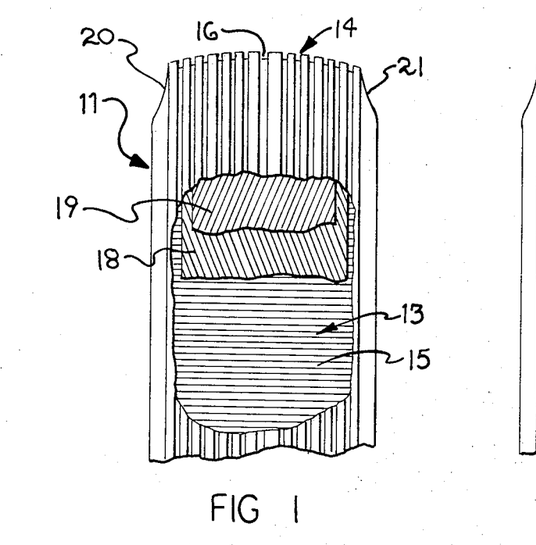
FIG. 1 is a front elevation view of a tire in accordance with the present invention, but having portions of the tread and carcass broken away in order to show the angular disposition of the cords of the various plies.

Reference may now be had to the drawings for a more detailed description of tires including constructional features which particularly constitute the subject matter of the present invention. In FIG. 1, reference numeral 11 identifies a tire in accordance with the present invention. The tire includes a carcass ply 13, connecting beads (not shown) and a ground engaging tread 14. The cords 15 of the carcass ply are formed of a multiplicity of glass filaments assembled as strands and yarns and plied into cords and extend from bead to bead at an angle which is normal to the peripheral centerline 16 of the tire and also normal to the tread grooves; one of which is the peripheral centerline. The tire also includes belt plies 18 and 19 which are situated above the carcass ply 15 and beneath the tread 14. The belt plies 18 and 19 extend laterally from one shoulder region 20 to the other shoulder region 21. The cords in the belt plies 18 and 19 are angularly disposed at an angle of 22° and may range from 20° – 25° and even up to about 30° with the peripheral center-line. The cords in ply 18 are inclined in a direction opposite to the cords in ply 19 and also define an angle of 20° – 30°, preferably 22° – 25°, with the peripheral centerline of the tire.

To manufacture the tire illustrated in FIG. 1, the "flat band" process as described earlier herein is utilized. Thus, the usual procedure in the "flat band" process is to wrap liner stock material, carcass ply or plies, breaker strips or belt ply or plies (depending on the tire design) and camelback (tread and side wall stock) successively about the rotatable tire building drum, followed by the setting of the beads including folding of carcass ply and side wall edges about the bead. The various components are knitted together with solvent and appropriate tools, after which the "green" tire in the general form of a beer barrel is removed from the drum. The "green" tire is then located in a several piece mold of the ultimate tire configuration. An expandable inner tube shaped bag is positioned inside the "green" tire and this is expanded as the mold is closed; the expansion forcing the central region of the preform outwardly to press the thickest region of the camelback into the tread definition region of the mold. During this step, the cords of the carcass shift from the so-called "green" angle (as defined when located on the tire building drum) to the cured angle (as defined in the finished tire, usually with respect to the peripheral centerline of the tread).

In accordance with one embodiment of the present invention, the usual method or technique as described is employed excepting that the carcass ply is cut and arranged on the tire building drum so that the cords are approximately parallel with the axis of rotation and the belt plies are so cut and assembled on the drum about the carcass ply and centrally thereof that the cords therein define an angle of from 30° to 60° with an imaginary annular circumferential line located midway between the lateral edges of the carcass or the lateral edges of the drum. The cords in the belt are formed of a plurality of strands, each in turn composed of a multiplicity of yarns which in turn are formed of a multiplicity ranging from 200 to several thousand individual filaments. The cords desirably bear the impregnant composition as described in more detail hereinafter. Also, the individual filaments of which the yarns, strands or cords are compoed desirably bear a surface size as will be described in more detail hereinafter. The angle of the cords in the belt plies as arranged on the tire building drum is selected as to be sufficiently large to allow a pantographing of the cords or, in other words, a shift in angular disposition to occur as the "green" beer barrel shaped tire is expanded during vulcanization in the manner described earlier herein. Thus, the inner tube shaped bag member inside of the beer barrel preform expands, forcing the central (tread) region of the preform to expand outwardly into contacting relationship with the tread region of the tire mold. The shift in angular relationship of the cords of the belt plies during expansion results in a final or cured cord angle in the belts ranging from 20° – 25°.

It must be appreciated that the amount of shift in angular relationship given in the foregoing description of the drawings is recited as representative of a particular size tire since the aspect ratio of the given tire will affect the amount of shift. The aspect ratio is the ratio of sectional height (SH) to sectional width (SW). Generally, the higher the aspect ratio, the more shifting that will occur and consequently, with a higher aspect ratio tire, a higher "green" or uncured angle will have to be selected in order to allow for achieving the desired preselected cured angle. On the other hand, with low aspect ratio tires, e.g., 0.7 to 0.8, the "green" or uncured angles will not have to be as large since the shift occurring will be less.

Figure 2:
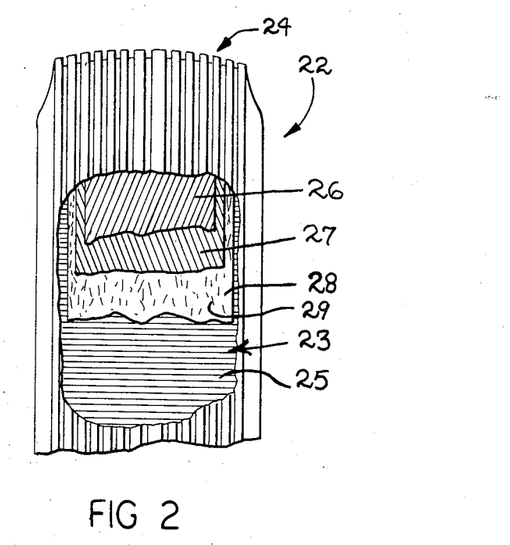
FIGS. 2 – 5 are likewise elevation views of tires featuring variant ply constructions and arrangements in accordance with alternative embodiments of the present invention.

In FIG. 2, there is disclosed a tire 22 featuring bead members (not shown), a connected carcass 23 and a tread 24. As can be seen, the principal carcass ply 23 is composed of cords 25 normally disposed with respect to the peripheral centerline. The tire also includes a pair of belts 26 and 27 having cords similarly inclined as the tire in FIG. 1; namely, 22° disposition with respect to the peripheral centerline. In accordance with a preferred embodiment of the present invention, the tire includes a thin sheet 28 of rubber disposed between the radial carcass ply 23 and the lowermost belt ply 27. This thin sheet 28 of rubber contains distributed therethrough a multiplicity of chopped lengths 29 of glass cords, yarns, strands or fibers. The chopped lengths 29 of glass are preferably substantially oriented circumferentially of the tire and serve the purpose of lending increased dynamic stability to the belt and tread regions of the tire. The glass elements desirably bear the size and impregnant as described hereinafter.

Figure 3:
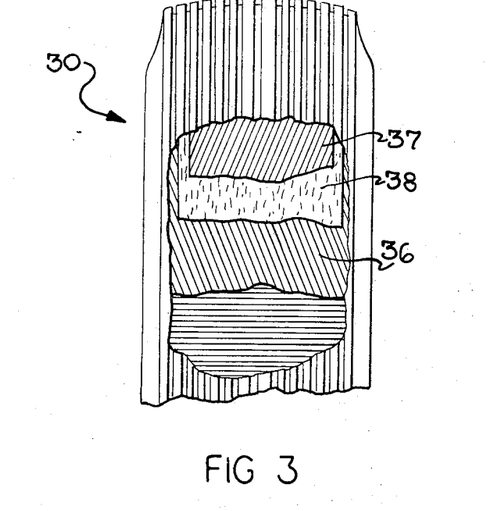

Referring now to FIG. 3, there is illustrated a tire 30 which is similar to the tires illustrated in FIGS. 1 and 2, excepting that the sheet 38 containing the circumferentially oriented chopped lengths of glass fibers, yarns, strands or cords is located between the belt plies 36 and 37; the glass cords of which are disposed at the preferred 22°.

Figure 4:
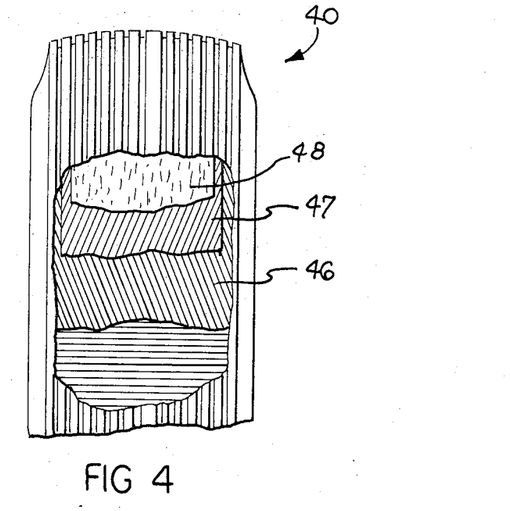

In FIG. 4, there is illustrated a tire 40 similar to the tire of FIGS. 1, 2 or 3, but differing in this embodiment in that the thin sheet 48 of rubber containing the chopped lengths of glass fibers, filaments, strands or cords is located on top of the belts 46 and 47 of the same cord angle.

Figure 5:
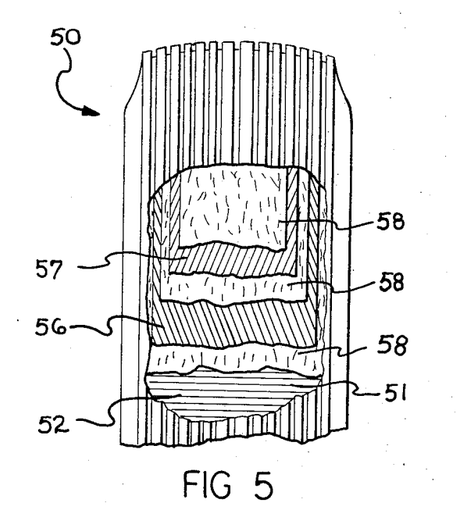

FIG. 5 illustrates a further embodiment of the present invention in which the tire 50 features a carcass 51 composed of radially disposed cords 52 and a pair of belt plies 56 and 57. In this embodiment, however, a separate thin sheet 58 containing chopped glass filaments, strands, yarns or cords is disposed in three locations; namely, between the carcass ply 51 and the lowermost belt ply 56, between the belt plies 56 and 57 and also on top of the belt plies.

Figure 6:
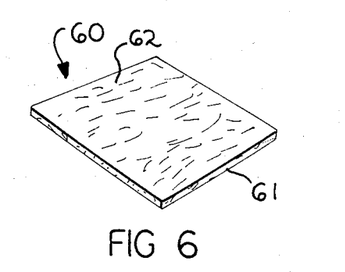
FIG. 6 is a perspective view of a segment of a thin sheet which is employed as an auxiliary reinforcement in accordance with embodiments illustrated in certain of the foregoing figures.

In FIG. 6, there is disclosed a segment 60 of a length of sheet material 61 formed of elastomeric stock having distributed therethrough chopped lengths 62 of glass fibers, strands, yarns or cords. As can be seen, the lengths 62 are substantially in oriented relationship lengthwise of the sheet 61. The length of sheet in the tire would be wrapped circumferentially about the belt plies or about the carcass ply in the manner illustrated in any of FIGS. 1–5. The sheet material as illustrated in FIG. 6 includes the chopped lengths which preferably range from about one-fourth inch to about 6 inches in length. The sheet material as described is produced by introducing into a mill mix of the particular elastomeric stock, whether it be natural rubber, a butadiene or styrene rubber, a mixture thereof or of polybutadiene, polyisoprene or other polyolefin stock, an amount of chopped lengths of filaments, strands, yarns or cords ranging generally from one-fourth inch to several inches in length. As the lengths are worked into the stock, some size degradation and, as well, separation of the glass strand or cord occurs. Glass provides an inert reinforcement material which increases the system modulus with minimal effect on the cross linking of the rubber and thus does not affect the resilience and life of the rubber polymer. The mixing of the glass yarns, etc., on the mill causes a substantial portion of the chopped lengths to assume a generally oriented relationship which is parallel to the movement of the stock on the mill. The chopped strand containing stock can also be calendered into appropriate thickness desired. Generally, the thin sheet of chopped strand containing stock material varies from about one thirty-second inch to about one-eighth inch in thickness, with one-sixteenth inch being preferred. In the embodiments illustrated in FIGS. 1–5, the width of the sheet has been shown as being in stepped relationship, depending upon its position below, between or above the belts. It will be appreciated that the width can be varied since under certain circumstances the thin sheet material located on top of the belts may desirably be some wider than the belts.

The thin sheet material as illustrated in the drawings features the chopped yarns oriented peripherally of the tire. In some instances, it may be desired that the calendered or mill produced stock be cut on a bias in such fashion that the orientation of the substantial proportion of the yarns is at some slight angle, ranging from 0° to about 12°, or higher, with the peripheral centerline. The sheet material may also under certain circumstances be so cut that the predominant orientation of the chopped strands is normal to the peripheral centerline or, in other words, generally parallel with the orientation of the radially disposed cords constituting the radial body ply.

Figure 7:
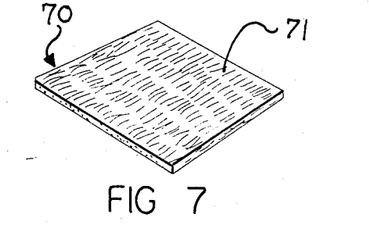
FIG. 7 is a view similar to that of FIG. 6, but illustrating a variant composition of the relatively thin sheet material in accordance with another embodiment of the present invention.

Referring now to FIG. 7, there is illustrated an alternate embodiment of the present invention wherein the sheet 70 employed to augment the mutually parallel and bias inclined cord belts contains lengths 71 of chopped strands, yarns or cords which are somewhat longer than those of the embodiment illustrated in FIG. 5. Furthermore, the chopped lengths 71 are essentially completely disposed in essentially completely parallel and ordered relationship. A sheet material of this type is produced by first depositing on a rather large drum measuring about 36–45 inches in diameter a layer of an unvulcanized elastomeric stock, followed by a filament winding of a yarn, strand or cord formed of a multiplicity of continuous glass filaments on top of the deposited layer of rubber; the repeated courses being in side-by-side relationship. The leading end and the trailing end of the filament wound strand are tucked under an adjacent wind and a second unvulcanized sheet of rubber is wrapped about the drum such that the filament wound cord is between the two layers of rubber. The thusly formed assembly or sandwich is cut from the drum and cut into appropriate strips which are assembled to provide the sheet as generally illustrated in FIG. 7. It will be appreciated that the sheet can be cut in a variety of angular or normal cuts such that the sheet or band wound in any one of its desired locations with respect to the carcass and/or belts can define any preselected angular relationship in terms of the orientation of the chopped yarns with respect to the peripheral centerline of the tire.

Figure 8:
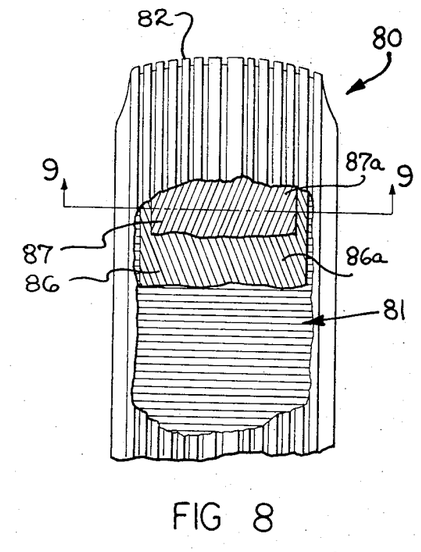
FIG. 8 is an elevation view similar to FIG. 1 of a tire including features of construction representing a further embodiment of the present invention.
Figure 9:
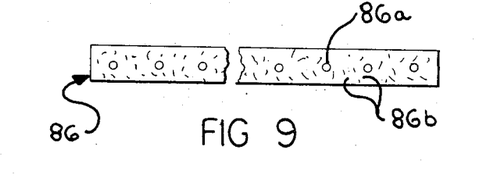
FIG. 9 is a partial sectional view taken long the line 9—9 of FIG. 8; extraneous parts being eliminated to aid in clarity and understanding.

Reference may now be had to FIGS. 8 and 9, wherein there is illustrated a tire 80 representing a further embodiment of the present invention. The tire 80 is composed of spaced beads (not shown), a connecting carcass 81 and a tread connected thereto at the crown region. The cords of the carcass ply are formed of a multiplicity of assembled glass filaments and the cords are disposed radially; that is, directly from bead to bead to define the angle of about 90° with the peripheral centerline. The tire features belt plies 86 and 87. The belt plies feature la cord angle of 20° – 24° and the cords 86a and 87a in adjacent plies are inclined in opposite directions. One of the belt plies 86 is shown in section in FIG. 9 and in accordance with this embodiment, the elastomeric stock surrounding the cords 86a contains randomly distributed therethrough an amount of chopped lengths 86b of glass in the form of filaments, strands, yarns or cords.

The presence of the chopped lengths, which may vary from three parts per hundred to 75 parts per hundred of the stock exclusive of the mutually parallel cords, increases considerably the modulus of the belt structure without any loss in plasticity, elasticity or nerve for reasons described herein; namely, that the glass does not serve as an absorber or sink for low molecular weight constituents of the elastomeric stock or plasticizing ingredients. A more preferred range for the lengths of glass is from 5 to 50 parts per hundred, while a range of 10 to 35 represents the most preferred.

Figure 10:
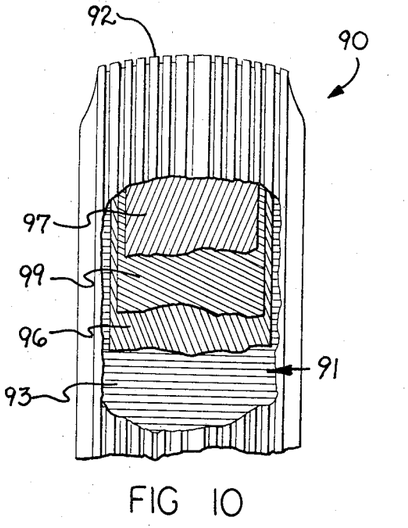
FIG. 10 is an elevation view of a tire generally similar to the tire of FIG. 1, but including features of ply construction which represent a further embodiment of the present invention.

Referring now to FIG. 10, there is disclosed a tire 90 representing a further embodiment of the present invention. The tire 90 is inclusive of spaced beads (not shown), a connected carcass 91 and a ground contacting tread 92. The body carcass features glass cords disposed radially as in the previous embodiments to form the principal radial body ply. The tire additionally features belt plies 96, 97 and 99. Belts 96 and 97 which are the inner and outer plies are disposed in the finished tire to define an angle with the peripheral centerline ranging from 20° – 25°. The centermost belt ply 99 features a glass cord angle of in the neighborhood of 60° – 70°, preferably 65°. The tire is built by the conventional "flat band" technique and the bias cut sheets and belts are of somewhat larger angles, namely, about 50° for the inner and outer belt plies, such that the pantographing accommodates the shifting of the angular disposition of the belt cords to that stated, namely, 20° – 25°. Similarly, the middle belt ply as located on the flat band has been bias cut on the bias cutting table such that the cord angle is somewhat greater than the 65°, for example, 75°, whereby the ultimate expansion into tire configuration causes the angle to shift to that desired, namely, approximately 65°.

Figure 11:
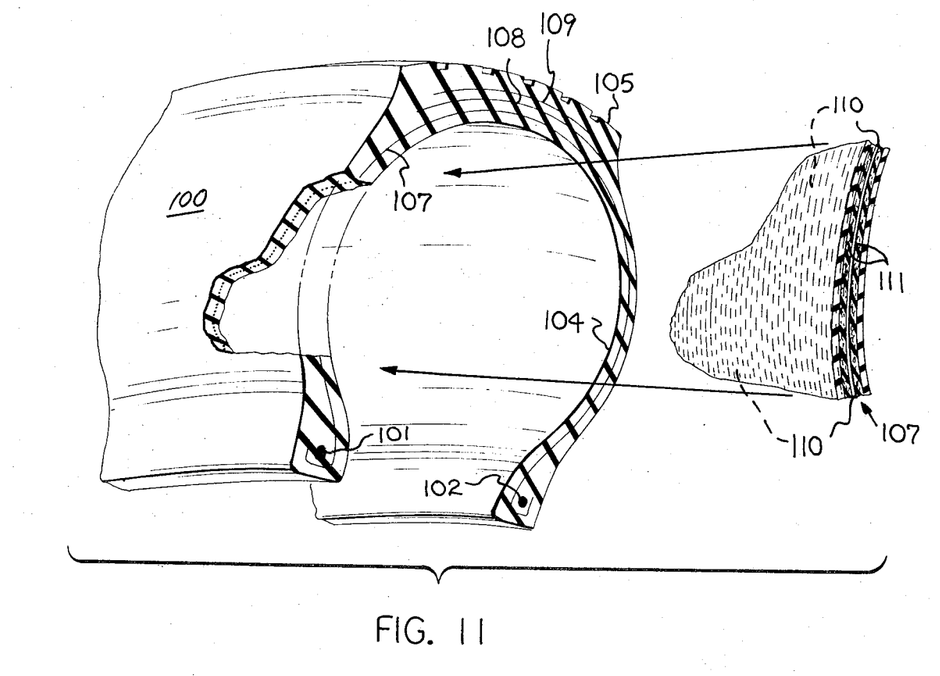
FIG. 11 is a perspective view of a tire including features of construction in accordance with a further embodiment of the present invention and with a segment of the tire broken away and enlarged in order to show details.

FIG. 11 illustrates a further embodiment of the present invention. The tire identified by the reference numeral 100 includes spaced beads 101 and 102 connected by a toroidal carcass 104 having at the crown thereof a ground engaging tread 105. A carcass ply 107 extends from one bead to the other and the tire features a pair of belt plies 108 and 109 situated between the tread and the crown of the carcass. The belt ply assembly may feature constructional features in accordance with any of the embodiments illustrateed in FIGS. 1–10. The carcass ply is composed of a plurality of side-by-side cords 110 (see the exploded segment of the sidewall at the right of FIG. 11). The cords are formed of a plurality of strands, each in turn formed of a multiplicity of glass filaments as have been described earlier herein. The side-by-side glass cords are of radial disposition; that is, they extend in the shortest possible path from one bead to another, defining an angle of about 90° with the peripheral centerline of the tire. The side-by-side cords are embedded centrally of a layer of elastomeric stock 111 of appropriate composition; the stock material having distributed therethrough lengths of glass in the form of filaments, strands, yarns, cords and/or mixtures thereof. The chopped lengths desirably have lengths within the ranges enumerated hereinabove and represent in an amount within the ranges hereinbefore specified. The lengths may be of random distribution and orientation or, in certain circumstances, the lengths may be oriented in a given direction. In some cases, an orientation generally parallel with the primary carcass cords 110 would be appropriate; while in other cases, an angular disposition would be appropriate; while in still other cases, an orientation normal to the radial cords would be most appropriate. The method of producing the carcass ply has been described earlier herein and need not be repeated.

Figure 12:
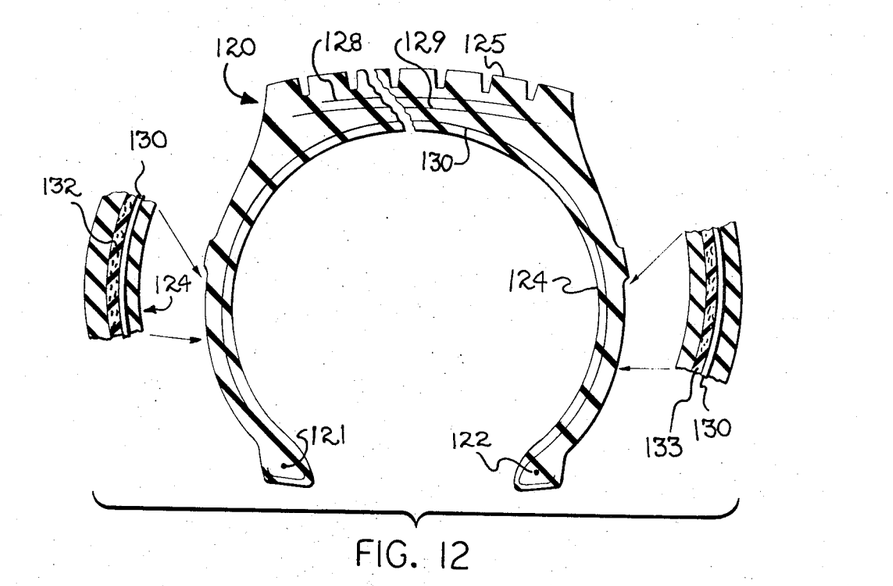
FIG. 12 is a sectional view of a tire including several different features of construction in accordance with a further embodiment of the present invention; the tire being shown in two segments, one-half representing one embodiment and the other half representing a variant but similar embodiment.

In FIG. 12, there is disclosed a tire 120 which is similar to the tire of FIG. 11, with the exception of the features described hereinafter. The tire is composed of spaced beads 121 and 122 joined by a toroidal carcass 124 which connects the beads. At the crown of the carcass, there is secured a tread 125. The tire features belt plies 128 and 129 beneath the tread and above the crown which may be constructed in accordance with any of the embodiments illustrated in the tires illustrated in FIG. 1-10. The carcass, in accordance with one embodiment, is shown somewhat enlarged to the left of FIG. 12. The reference numeral 130 identifies the carcass cord proceeding in radial fashion from one bead to the other. The cord is formed of an assembled plurality of strands and/or yarns, each of which in turn is formed of a multiplicty of continuous glass filaments as described earlier herein. Just to the outside of the glass cords, there is positioned a layer 132 of an appropriate elastomeric stock having distributed therethrough lengths of glass in the form of filaments, yarns, strands, cords or the like. The layer generally reaches from proximate the bead area to the shoulder region.

In accordance with an embodiment illustrated in the enlarged portion of the side wall to the right of FIG. 12, the cord 130 has situated just inside of it a layer of elastomeric stock 1333 having distributed therethrough lengths of glass in the form of filaments, strands, yarns, cords or the like. The positioning of the elastomeric stock containing the lengths of glass yarns or the like in abutting relationship to the principal radial carcass cords serves to affect the spring rate of the side wall region of the carcass of the radial cord. The thickness of this layer, the amount of glass, the composition of the glass, the orientation of the glass lengths, etc., can all be adjusted to give or vary the desired spring rate in order to meet the particular service requirements of the tire, having in mind further, of course, the size of the tire, the aspect ratio, etc.

Figure 13:
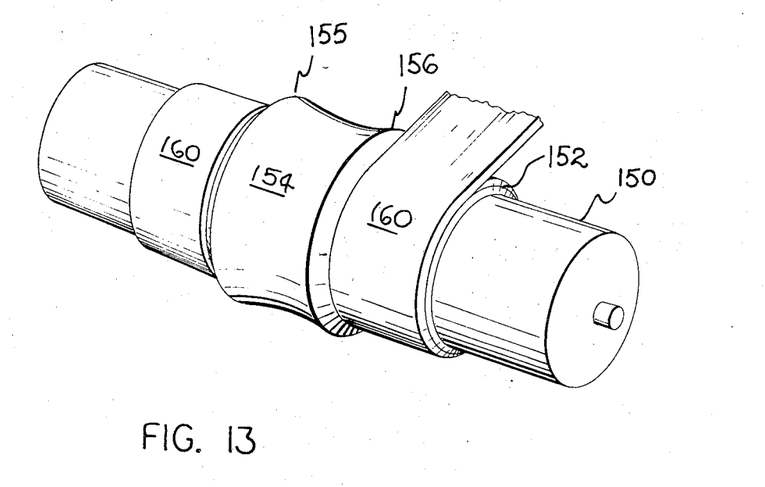
FIG. 13 is a schematic perspective view illustrating an intermediate stage in the method of producing tires by the "flat band" technique; the tire preform representing a particular embodiment of the present invention.

A tire in accordance with either of the embodiments illustrated in FIG. 12 is shown in an intermediate state of production in FIG. 13, wherein there is schematically illustrated the laying up of various unvulcanized rubber preform components upon a rotatable drum 150. Reference numeral 152 identifies a preassembly of liner stock and carcass ply. Reference numeral 154 identifies the camelback extrusion including the tread extending from region 155 to region 156. Reference numeral 160 identifies a pair of sheets, one of which on the left has been wrapped about the assembled components of the "green" tire, specifically in the side wall region between the leftmost bead and the shoulder region. The one on the right is being wrapped about the side wall region on the other side. The sheets 160 of elastomeric stock contain distributed therethrough lengths of glass in the form of filaments, strands, yarns, cords or the like. The mill mixed production of such elastomeric sheets has been described earlier herein. It will be appreciated that when the one sheet 160 has been completely wrapped about, the components will be knitted together by the operator utilizing various tools and solvent, following which the beads can be "set" and the drum collapsed, allowing the beer barrel shaped unvulcanized preform to be removed therefrom, ready for vulcanization in a mold arrangement as previously described herein or any other similar molding apparatus.

It is to be appreciated that the compound objectives of the present invention, amongst which are (1) providing a radial tire featuring glass as the sole or principal reinforcement and (2) providing for the disposition and composition of the glass cord as to permit realization of the advantageous properties of the glass, are achieved when the "green" and the cured cord angles of the belts are selected as to most readily accommodate the shifting, from "green" angle to cured angle, expected with a given aspect ratio tire. In this framework, "green" cord angles, of the belt as wrapped about the tire building drum, ranging from about 30° to about 60° are desired and are found to successfully pantograph or shift during Bag-O-Matic expansion and cure to cured cord angles ranging from about 20° to about 30°. It is believed that the foregoing represent ranges which are realistically reproducible productionwise. Tires of somewhat smaller "green" and cured angles are, however, within the broader scope of the present invention since, while not as realistic in terms of production efficiency, they are nonetheless possessed of improved properties and the lack in production efficiency can be overcome. "Green" cord angles as measured with respect to the circumferential meridian of the drum of from about 45° to about 60° represent a preferred range for tires having aspect ratios from about 0.7 to about 0.85 since the shifting of the cords during expansion to cured angles of 20° – 25° is more assured and uniformly accomplished. Considering all of the factors involved, it is to be appreciated that the final cure angle of the belt cords may be as large as 30°. In such cases, the use of the additional layer such as identified as 38 in FIG. 3 is usually desired to enhance the stability of the tire in the belt and tread region.

Cord angles lower than those recited above tend to result in a failure of the tire to expand. With this lower limit, it is generally, however, preferred that the cord angles be as small as possible since the larger the cord angle in the belt, the tendency is for the resulting tire to be less stable in the tread region. As indicated, this tendency is offset, in accordance with a principal embodiment of the present invention, by employing auxiliary reinforcement, proximate the belts, in the form of sheet stock containing chopped lengths of glass fiber, strand, yarn or cord. Where cord angles in the belt plies of the cured tire are in the upper region of the range referred to, it is most desirable that the chopped lengths of glass in the sheet stock be majorly oriented parallel with the circumferential centerline of the tire as this orientation favors stability of the tire.

The present invention additionally contemplates radial tire constructions comprising a combination of organic and glass components in particular relationship and constituting appropriate selection of the organic and manufacturing technique. One such construction envisions a carcass featuring radial cords of a heat shrinkable material such as a polyester cord and belt plies formed of glass cords. The belt cord angles are selected to exert a restrictive effect in the inflated configuration. Additionally, the length of the radial cords is selected and an appropriate drum set utilized such that the shrinkage of the cords during vulcanization in combination with restrictive influence of the glass cord belts during ultimate inflation results in an expansion principally in the side wall regions of the tire. The resulting tire possesses an extremely low rolling radius, coupled with a softer side, than the conventional radial tires and yet possesses a very stable footprint due to the stabilization of the tread accomplished with the glass cord belt plies particularly when unitized as achieved by the employment of the auxiliary sheet, containing chopped lengths of glass strand, cord, yarn or the like, located between the belt plies, or above, or below, or inbetween, as well as above and below as illustrated in FIG. 5. The radial cords may also be nylon.

A principal feature of the present invention resides in the provision for unitization of the belt plies by the expedient of utilizing an auxiliary reinforcement member in the form of a relatively thin sheet of elastomeric stock containing distributed therethrough an amount of chopped glass filaments, strands, yarns, cords and/or combinations thereof. When cured, the belt plies, particularly when the auxiliary reinforcement sheet containing the chopped lengths is located between the belt plies, tend to be locked together due, in part, to the higher modulus of the auxiliary reinforcement. This occurs essentially regardless of the orientation of the chopped lengths; that is, even with random orientation and distribution. Usually, it is preferred that the lengths be majorly oriented in a given direction, be it peripheral, inclined or normal to the peripheral centerline. It is further believed that the auxiliary reinforcement described serves to enhance the transfer of stress from the cords in one belt to the cords in the other belt, whereby the belts complement each other rather than acting independently. In this sense, the assembly of two belts and the auxiliary sheet or sheets acts singularly as if but one belt structure were involved, e.g., a monobelt, albeit having balance due to the oppositely inclined cords in the structure as illustrated in the drawings.

The principal carcass ply of the tire of the present invention featuring radially disposed cords may be composed of cords formed solely of glass subelements or may be formed of a proportion of cords formed of organic materials such as the rayons, polyamides, polyesters, polyolefins, etc. The proportioning of the cord materials and the disposition thereof will be dictated by the particular service and the performance required.

An elastomeric sheet which contains glass therein and is of utility in the fabrication of tires within the present invention is produced by passing an array of glass cords in parallel relationship through a rubber calender to embed the glass in the calendered sheet. Thereafter, the sheet is passed between a pair of counterrotating rolls, one having a yieldable surface and the other bearing a plurality of individual cutter blades extending radially from its surface; the blades being located as to cut the glass cords into lengths, the ends of which are staggered. Thus, the blades are in circumferentially staggered relationship and in rows corresponding to the number of cords embedded in the calendered sheet. The resulting sheet will still be unitary and can be bias cut at any angle and incorporated into a tire as an auxiliary belt structure reinforcement or as a carcass cord support for control of spring rate.

By way of further explanation, it will be appreciated that filaments of glass are drawn in a molten state from a heated multi-orifice platinum bushing and gathered together into strand configuration contemporaneous with the spraying thereon of a size composition preferably containing an anchoring agent adapted to impart to the glass surface the ability to adhere to the ultimate rubber stock. Generally, 204 filaments are gathered together to form a strand, although a strand may be composed of 400, up to 900 and occasionally 2,000 filaments; in each case, drawn from a single bushing. The strands become cooled and solidified in the attenuation thereof at high rates of speed from the bushing and are wound after sizing onto a spool. The continuous strand wound about a spool can then be plied and combined with additional like strands to form multiple strand yarns. Additionally, the multiple strands and yarns can be plied and combined with like yarns with or without twist to form the cords or bundles as referred to earlier herein. As indicated, the glass filaments are preferably coated with a suitable size, for example, an amino silane; a variety of formulations for which are disclosed in U.S. Pat. application Ser. No. 406,501, filed Oct. 26, 1964, now U.S. Pat. No. 3,391,052, entitled "Glass Fibers Treated For Combination With Elastomeric Materials and Method" and being assigned to the assignee of the present application. One typical size composition is composed of 0.5-2.0 percent by weight of gamma-aminopropyltriethoxy silane, 0.1-0.5 percent by weight of a cationic lubricant such as an amino polyester or a cationic softener such as glycerine and the remainder composed of water. The strands or yarns composed of assembled continuous glass filaments of which the cords are composed are impregnated with an elastomeric impregnant to assist in the attachment thereof to the surrounding rubber matrix in the tire construction. The strands, yarns or cords are impregnated by immersion in a suitable impregnant bath, for example, 60-40 parts by weight of a 38 percent dispersed solids system including a butadiene-styrene-vinyl pyridine terpolymer latex, a butadiene styrene latex and a resorcinol-formaldehyde resin; said solids being dispersed in 40 parts by weight of water. A suitable commercial product of the above composition is "LOTOL 5440," a product marketed under that trade name by Uniroyal (formerly U.S. Rubber Company).

The present invention further envisions, as an article of manufacture, a vulcanizable band or belt adapted for incorporation interiorly of an elastomeric product which would be subsequently molded. The belt or band includes a vulcanizable elastomeric matrix and, embedded therein in parallel relationships, two or more, slightly spaced sets of cords; the cords in each set defining a plane, being in mutually parallel relationship and being inclined at an angle of 30° to 60° with the longitudinal axis of the band or belt. Thhe cords in the second set would be inclined in a direction substantially opposite to the cords in the first set; both, of course, taken with respect to the longitudinal axis on the band or belt. The cords are composed of a plurality of assembled strands, each composed of a multiplicity of continuous glass filaments. The bands or belts, particularly having in mind the inclination of the cords of from 30° to 60°, find particular utility in incorporation into a "flat band" tire building operation wherein the tires being produced feature radially disposed cords in accordance with the present invention. The bands or belts featuring an angular disposition of the cords of from 30° to 60° are adapted for practice in the method of the present invention, namely, the production of the radial tire on the "flat band"type of equipment; the 30° to 60° angle permitting pantographing or shifting of the cord angle from the "green" angle on the tire building drum to a cured angle in the range of from 20° to 30°, and particularly 20° to 25°. The vulcanizable band or belt adapted for incorporation interiorly of an elastomeric product desirably includes within the above-described matrix a plurality of lengths of glass filaments, strands, yarns, cords and/or mixtures thereof in proximity to the mutually parallel cords. In accordance with a preferred embodiment, the plurality of lengths are concentrated inbetween the sets of cords.

By way of further explanation, it will be appreciated tha the illustrations of the various components of the tire, as, for example, in FIGS. 1–4, are somewhat schematic in nature in that the belt plies, for example, 36 and 37 of FIG. 3, and the auxiliary layer 38 are not as sharply and individually composed in the cured tire as might be interpreted from these drawings. Thus, it will be appreciated that in the molding operation the several belt plies and the auxiliary reinforcement 38 will tend to unify into an integral singular structure with some migration, certainly due to flow of rubber, of one component into the other.

Figure 14:
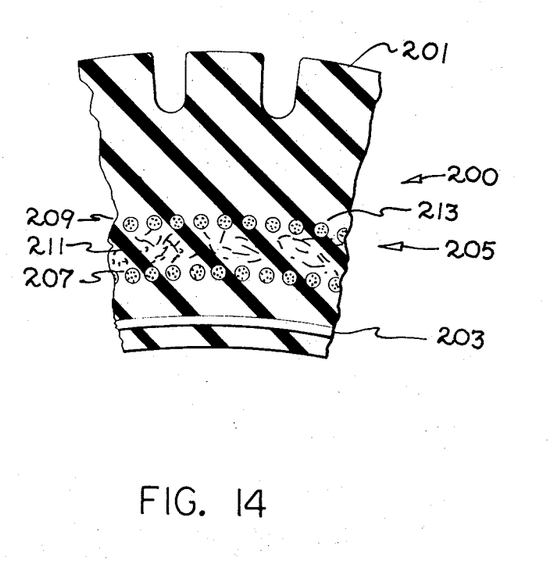
FIG. 14 is a sectional view of a segment of a tire in the crown region serving to lend clarity to an understanding of the nature of the tire construction in the cured form.

Reference may be had in this regard to FIG. 14, wherein there is disclosed or illustrated a crown portion of a tire 200 having a ground engaging tread 201 and a carcass composed of a plurality of side-by-side cords 203 extending radially from bead to bead (not shown). Above the carcass, there is situated a belt assembly 205 composed of a lower set of mutually parallel cords 207 and another set of mutually parallel cords 209 just thereabove. Inbetween the two sets of cords, there is a segment of rubber containing a plurality of chopped lengths of glass cords, yarns, strands, filaments or the like, or mixtures thereof; this segment being identified by the reference numeral 211. The sets of cords 207 and 209 are each composed of a multiplicity of glass filaments assembled together in the form of subassemblies such as strands or yarns and finally cords; a cord being identified by the reference numeral 213. Comparing FIG. 3 with FIG. 14, it will be appreciated that the illustration at FIG. 14 more closely approximates the actual ultimate tire in that the sets of cords and the interposed segment of elastomer containing chopped lengths is a unitary structure within the overall tire and not composed of independent discrete sheets or layers.

Cord structures, formed of a multiplicity of glass filaments, employed in the practice of the method of the present invention featuring the production of radially disposed cords and 20° – 30° bias inclined belt cords in the cured state, are desirably formed by plying together three five-strand assemblies of two hundred and four filaments each. Such a cord includes therefore about 3,000 filaments and is conventionally identified as a "5/3" cord structure. The number of filaments per strand may vary from the 204 filament type to a strand including 408 or even up to 2,000 filaments.

The employment of glass filaments in the form of cords or bundles as described hereinbefore is most preferred in the practice of the invention due to their dimensional stability, relative inextensibility, virtual immunity to change in properties due to atmospheric conditions and substantial freedom from yield under stress. However, it is possible to employ other materials such as metal wires and the like, including rayon, carbon fibers and the like; which materials are of relatively high modulus as compared to other synthetic and natural occurring materials.

From the foregoing, it will be appreciated that the present invention in improved radial tire construction and method of manufacture is quite comprehensive in scope and that the variant specific embodiments disclosed and described will be suggestive to those skilled in the art of tire manufacture of a number of additional specific tire structures and techniques for their manufacture which constitute obvious modifications and equivalents of the concepts first proposed herein. Accordingly, all such structures and techniques constituting obvious modifications and equivalents are intended to be embraced by the appended claims unless clearly violative of the language thereof.

I claim:

1. A unitary preformed belt construction suitable for interior reinforcement of elastomeric products, said belt comprising:
   a vulcanizable matrix,
   a first set of mutually parallel cords embedded in said matrix,
   a second set of mutually parallel cords embedded in said matrix,
   said cords being inclined with respect to the longitudinal axis of said belt, the inclination of the cords in one set being substantially equal to the inclination of the cords in the other set but in an opposite direction with respect to the longitudinal axis of said belt, said cords being composed of a plurality of assembled strands, each composed of a multiplicity of continuous glass filaments, said cords defining an angle ranging from 30° to 60° with the longitudinal axis of said belt and
   a plurality of lengths of glass filaments, strands, yarns, cords and mixtures thereof located within said matrix proximate said cords of said first and said second set.

2. A belt construction as claimed in claim 1, wherein said lengths are concentrated in the region of said belt inbetween said sets of cords.

3. A belt construction as claimed in claim 2 wherein said lengths range from about one-fourth to about six inches in length.

4. A belt construction as claimed in claim 3 wherein said lengths are randomly oriented.

* * * * *